Nov. 3, 1931. B. W. HELMAN 1,829,747
AUTOMOBILE DOOR WINDOW
Filed Oct. 27, 1930
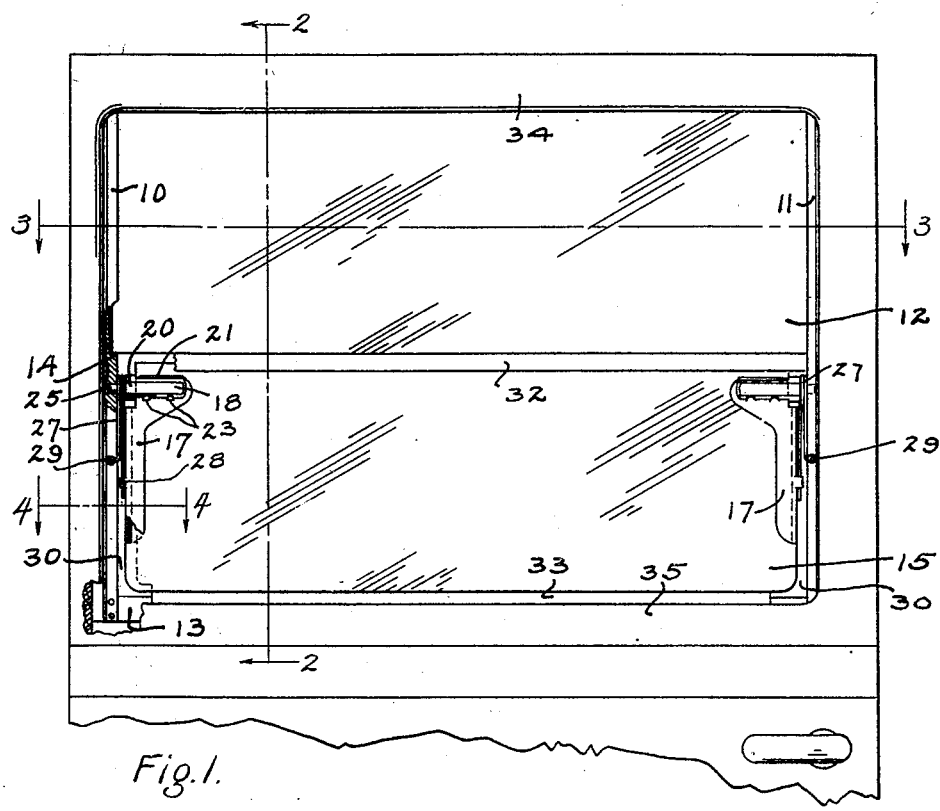
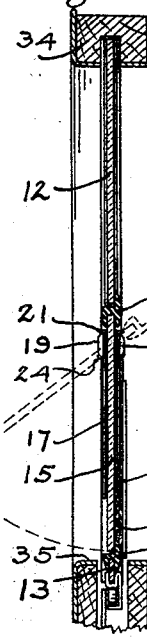
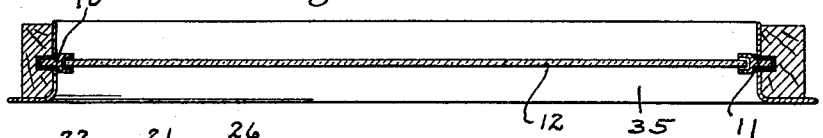
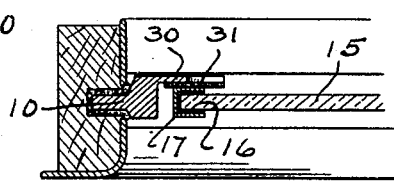
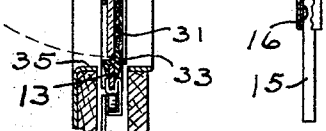
Inventor,
Barney W. Helman,
By Minturn & Minturn,
Attorneys.

Patented Nov. 3, 1931

1,829,747

UNITED STATES PATENT OFFICE

BARNEY W. HELMAN, OF NEAR INDIANAPOLIS, INDIANA

AUTOMOBILE DOOR WINDOW

Application filed October 27, 1930. Serial No. 491,409.

This invention relates to the art of windows and particularly to a two piece window adapted for use in automobile doors.

An important object of the invention is to provide a window that may be readily opened by pressure thereon to permit the driver of an automobile to extend his arm through the window to give signals. Other important objects reside in the particular means for returning the movable section of the window to its normal closed position; in providing a unit that may replace the usual one piece glass; in providing means for preventing the opening of the movable section when the car is to be locked up; and in the new association of the various elements comprising the structure employed to achieve the above indicated objects.

These and other objects will become apparent in the following description of the invention, with reference being made to the accompanying drawings, in which Fig. 1 is a fragmentary side elevation of the upper portion of an automobile door employed in my invention;

Fig. 2, a vertical transverse section on the line 2—2 in Fig. 1;

Fig. 3, a horizontal section on the line 3—3 in Fig. 1;

Fig. 4, a detail in horizontal section on the line 4—4 in Fig. 1;

Fig. 5, a detail in end elevation of the lower glass section; and

Fig. 6 is a side elevation of the pintle bracket.

Referring to the drawings, in which like characters of reference indicate like parts throughout the several views, I provide the two vertical side rails 10 and 11 between the upper ends of which is secured the glass 12. The lower ends of the rails are tied together rigidly by the horizontal bar 13 which is engaged by the usual window raising and lowering mechanism as indicated in Fig. 2, the details of such mechanism not forming a part of my invention.

The rails 10 and 11 are formed to enter by their outer edges into the vertical grooves in the door, originally receiving the customary one piece glass. The upper ends of the rails are provided with U channels into which the ends of the glass 12 project. The channels terminate to provide shoulders 14 on which the glass 12 rests by its lower corners. A lower glass 15 is provided to fit loosely within the space between the rails 10 and 11 and below the glass 12 and above the bar 13. About each vertical edge of the glass 15 I place therearound a thickness of adhesive tape 16, over which I press the U-shaped shield 17, the upper end of which extends inwardly from the edge of the glass for a distance to receive thereover on each side the legs 18 and 19 of the pintle bracket 20, the bracket being frictionally engaged thereover without pins or other securing means. Lips 21 and 22 respectively are turned outwardly from the shield 17 on each side of the glass 15 over the legs 18 and 19 and tongues 23 and 24 are turned out from the shield 17 and upwardly against the under side of the legs of the bracket 20, whereby the bracket 20 is held against vertical displacement along the shield 17.

Each bracket 20 has a pintle 25 extending laterally therefrom and separated from the bracket proper by a cylindrical surface 26 of greater diameter than that of the pin 25. About the surface 26 is wrapped a torsional spring 27 one end of which is carried down along the shield 17 and inserted under a loop 28 spaced outwardly therefrom. The pintles 25 are rockably carried in holes provided in the rails 10 and 11 and the other ends of the spring 27 are provided with eyes through which screws 29 are passed and engaged in the outer sides of the rails, in such manner that the springs 27 normally tend to swing the glass 15 from an outer position as indicated by the dash lines in Fig. 2 to the closed position against the flanges 30 projecting from the side rails as shown in Figs. 1, 2, and 4, the felt 31 being provided to cushion the glass as it bears against the flanges 30.

Preferably a flanged rubber 32 is positioned on the upper horizontal edge of the glass 15 to close the gap between it and the upper glass 12 when the glass 15 is in the closed position. In the same manner a rubber 33 is carried on the bar 13 to close the gap between the under edge of the glass 15 and the bar. It will be observed, Fig. 2, that when the upper glass 12 is carried to its upper limit of travel, its upper edge is entered in the channel in the under side of the transverse member of the door 34 and the lower edge of the glass 15 is above the sill 35 of the door. When the driver of the automobile desires to extend his arm to without the car, he merely pushes on the glass 15 to open it to some such position as indicated by the dash lines, Fig. 2, the springs 27 offering but slight resistance to the movement of the glass. Immediately the arm is withdrawn, the glass 15 returns to its normal closed vertical position, aided by the springs 27 which hold the glass 15 in the closed position snugly against the flanges 30 to prevent objectionable rattle, and to maintain a weatherproof closure.

Should it be desired to prevent unwarranted admission to the car, the side rails 10 and 11 are lowered slightly by means of the usual window lowering mechanism (not shown) to have the upper end of the glass 12 still remaining within the channel in the member 34 and to have the lower edge of the glass 15 just below the edge of the sill 35 whereby the edge would strike the sill and prevent swinging of the glass therepast. It is thus to be seen that I have provided a two piece window in a very simple and neat manner without the necessity of having to bore holes through the glass sections. In fact in making an installation I take the glass formerly employed in the one piece form and cut it to make the two sections. The shield 17 in combination with the adhesive tape 16 and the compressive action of the legs of the bracket 20 grip the glass 15 with such force as to retain it without further securing means.

While I have here shown and described my invention in the one form as now best known to me, it is obvious that structural changes may be made without departing from the spirit of the invention, and I, therefore, do not desire to be limited to that precise form, nor any more than may be required by the following claims.

I claim:

1. For an automobile door having a window opening therein with opposing vertical channels therealong, a pair of side rails adapted to enter said channels, a glass held between the upper ends of the channels, vertical edge shields on the glass, a lower glass, brackets frictionally engaging over the shields on the lower glass, means preventing vertical displacement of the brackets and pintles extending from the brackets rotatably engaging with said side rails, the combined height of said two glasses being slightly greater than the height of said opening.

2. For an automobile door having a window opening therein with opposing vertical channels therealong, a pair of side rails adapted to enter said channels, a glass held between the upper ends of the channels, a lower glass, brackets supporting the lower glass, and pintles extending from the brackets rotatably engaging with said side rails, said brackets frictionally engaging over said glass, and means preventing vertical displacement of the brackets.

3. For an automobile door having a window opening therein with opposing vertical channels therealong, a pair of side rails adapted to enter said channels, a glass held between the upper ends of the channels, vertical edge shields on the glass, a lower glass, brackets frictionally supporting the shields on the lower glass, means preventing vertical displacement of the brackets and pintles extending from the brackets rotatably engaging with said side rails, flanges on the rails preventing inward swing of the lower glass, and a spring cooperating between the glass and a side rail normally holding the lower glass against said flanges.

4. For an automobile door having a window opening therein with opposing vertical channels therealong, a pair of side rails adapted to enter said channels, a glass held between the upper ends of the channels, vertical edge shields on the glass, a lower glass, brackets engaging over and frictionally supporting the shields on the lower glass, and pintles extending from the brackets rotatably engaging with said side rails, flanges on the rails preventing inward swing of the lower glass, and a spring cooperating between the glass and a side rail normally holding the lower glass against said flanges, the combined height of said two glasses being slightly greater than the height of said opening.

5. For an automobile door window opening having vertically disposed guide channels, a replacing unit comprising a pair of side rails adapted to enter said channels, a bar joining the lower ends of the rails, an upper glass held between said rails, shoulders on the rails on which said glass rests, a lower glass, shields engaging about the vertical edges of the lower glass, pintle brackets having legs compressively engaging over the shields near the upper edge of the glass, and pintles extending from the brackets rotatably carried in said rails.

6. For an automobile door window opening having vertically disposed guide channels, a replacing unit comprising a pair of side rails adapted to enter said channels, a bar joining the lower ends of the rails, an upper glass held between said rails, shoulders on the rails on which said glass rests, a lower glass, shields engaging about the vertical edges of the lower glass, pintle brackets having legs compressively engaging over the shields near the upper edge of the glass, and pintles extending from the brackets rotatably carried in said rails, and springs normally returning the lower glass to vertical, depending position.

7. For an automobile door window opening having vertically disposed guide channels, a replacing unit comprising a pair of side rails adapted to enter said channels, a bar joining the lower ends of the rails, an upper glass held between said rails, shoulders on the rails on which said glass rests, a lower glass, shields engaging about the vertical edges of the lower glass, pintle brackets having legs compressively engaging over the shields near the upper edge of the glass, and pintles extending from the brackets rotatably carried in said rails, and springs normally returning the lower glass to a vertical depending position, the combined height of the said two glasses being slightly greater than the height of the window opening.

In testimony whereof I affix my signature.

BARNEY W. HELMAN.